United States Patent
Kang et al.

(10) Patent No.: US 7,304,400 B2
(45) Date of Patent: Dec. 4, 2007

(54) POWER GENERATING SYSTEM AND ITS CONTROL METHOD

(75) Inventors: Junkoo Kang, Fukuoka (JP); Saemitsu Hayashi, Fukuoka (JP); Shinya Morimoto, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 262 days.

(21) Appl. No.: 10/539,009

(22) PCT Filed: Dec. 25, 2003

(86) PCT No.: PCT/JP03/16749

§ 371 (c)(1), (2), (4) Date: Jun. 15, 2005

(87) PCT Pub. No.: WO2004/062080

PCT Pub. Date: Jul. 22, 2004

(65) Prior Publication Data

US 2006/0119105 A1 Jun. 8, 2006

(30) Foreign Application Priority Data

Dec. 27, 2002 (JP) ............................. 2002-379675

(51) Int. Cl.
*H02P 9/00* (2006.01)
*H02P 9/10* (2006.01)
*H02P 9/14* (2006.01)
*F03D 7/00* (2006.01)

(52) U.S. Cl. ............................ 290/44; 290/52; 322/29
(58) Field of Classification Search ................. 290/44, 290/52; 322/29
See application file for complete search history.

(56) References Cited

U.S. PATENT DOCUMENTS

| | | | | |
|---|---|---|---|---|
| 4,042,862 A | * | 8/1977 | Franklin | 318/800 |
| 4,400,659 A | * | 8/1983 | Barron et al. | 322/32 |
| 4,525,633 A | * | 6/1985 | Wertheim et al. | 290/44 |
| 4,695,736 A | * | 9/1987 | Doman et al. | 290/44 |
| 4,700,081 A | * | 10/1987 | Kos et al. | 290/44 |
| 4,703,189 A | * | 10/1987 | DiValentin et al. | 290/44 |
| 4,816,696 A | * | 3/1989 | Sakayori et al. | 290/52 |
| 4,891,744 A | * | 1/1990 | Yamamoto et al. | 363/89 |
| 4,994,684 A | * | 2/1991 | Lauw et al. | 290/52 |
| 5,083,039 A | | 1/1992 | Richardson et al. | |

(Continued)

FOREIGN PATENT DOCUMENTS

JP 9-191698 A 7/1997

(Continued)

*Primary Examiner*—Darren Schuberg
*Assistant Examiner*—Pedro J. Cuevas
(74) *Attorney, Agent, or Firm*—Sughrue Mion Pllc.

(57) ABSTRACT

A power controller 5 calculates the induced voltage or rotor magnetic flux from the output voltage and the output current of a generator 3, estimates a shaft speed of the generator 3 from the phase of the induced voltage or the phase of the rotor magnetic flux, and calculate the output of a windmill 1 from the estimated value of the shaft speed and the output of the generator 3. As a result, since the output of the windmill 1 can be calculated without requiring a speed sensor for detecting the shaft speed of the generator 3, it is possible to accomplish simplification of circuits, reduction of cost, and high reliability.

8 Claims, 7 Drawing Sheets

U.S. PATENT DOCUMENTS

| | | | |
|---|---|---|---|
| 5,155,375 A * | 10/1992 | Holley | 290/44 |
| 5,225,712 A * | 7/1993 | Erdman | 290/44 |
| 5,663,600 A * | 9/1997 | Baek et al. | 290/55 |
| 5,798,632 A * | 8/1998 | Muljadi | 322/29 |
| 6,137,187 A * | 10/2000 | Mikhail et al. | 290/44 |
| 6,420,795 B1 * | 7/2002 | Mikhail et al. | 290/44 |
| 6,566,764 B2 * | 5/2003 | Rebsdorf et al. | 290/44 |
| 6,801,019 B2 * | 10/2004 | Haydock et al. | 322/17 |
| 6,847,128 B2 * | 1/2005 | Mikhail et al. | 290/44 |
| 6,853,094 B2 * | 2/2005 | Feddersen et al. | 290/44 |
| 6,856,038 B2 * | 2/2005 | Rebsdorf et al. | 290/44 |
| 6,856,039 B2 * | 2/2005 | Mikhail et al. | 290/44 |
| 6,856,040 B2 * | 2/2005 | Feddersen et al. | 290/44 |
| 6,856,041 B2 * | 2/2005 | Siebenthaler et al. | 290/44 |
| 6,933,625 B2 * | 8/2005 | Feddersen et al. | 290/44 |
| 7,015,595 B2 * | 3/2006 | Feddersen et al. | 290/44 |
| 7,038,330 B2 * | 5/2006 | Rosebrock et al. | 290/44 |
| 7,042,110 B2 * | 5/2006 | Mikhail et al. | 290/44 |
| 7,068,015 B1 * | 6/2006 | Feddersen | 322/89 |
| 7,095,130 B2 * | 8/2006 | Ichinose et al. | 290/44 |
| 7,095,131 B2 * | 8/2006 | Mikhail et al. | 290/44 |
| 7,095,132 B2 * | 8/2006 | Kikuchi et al. | 290/52 |
| 7,095,133 B2 * | 8/2006 | Kimura et al. | 290/52 |
| 7,141,887 B2 * | 11/2006 | Okubo et al. | 290/44 |
| 7,145,262 B2 * | 12/2006 | Kikuchi et al. | 290/44 |
| 7,157,804 B2 * | 1/2007 | Kimura et al. | 290/52 |
| 7,180,202 B2 * | 2/2007 | Wobben | 290/44 |
| 7,190,085 B2 * | 3/2007 | Moehlenkamp | 290/44 |
| 7,205,676 B2 * | 4/2007 | Ichinose et al. | 290/44 |
| 7,215,099 B2 * | 5/2007 | Ylppo et al. | 322/29 |
| 7,235,891 B2 * | 6/2007 | Tokiwa et al. | 290/10 |
| 2003/0015876 A1 * | 1/2003 | Ichinose et al. | 290/44 |
| 2004/0041404 A1 * | 3/2004 | McConnell | 290/52 |
| 2004/0066044 A1 * | 4/2004 | Matsuo et al. | 290/52 |
| 2004/0080164 A1 * | 4/2004 | McKelvey et al. | 290/52 |
| 2005/0017512 A1 * | 1/2005 | Kikuchi et al. | 290/44 |
| 2005/0017672 A1 * | 1/2005 | Suzuki et al. | 318/802 |
| 2005/0151377 A1 * | 7/2005 | Ichinose et al. | 290/44 |
| 2006/0001393 A1 * | 1/2006 | Rozman | 318/439 |
| 2006/0028025 A1 * | 2/2006 | Kikuchi et al. | 290/44 |
| 2006/0214429 A1 * | 9/2006 | Kikuchi et al. | 290/44 |
| 2006/0244265 A1 * | 11/2006 | Ichinose et al. | 290/44 |
| 2007/0100506 A1 * | 5/2007 | Teichmann | 700/297 |

FOREIGN PATENT DOCUMENTS

| | | |
|---|---|---|
| JP | 2002-34298 A | 1/2002 |
| JP | 2002-84797 A | 3/2002 |

* cited by examiner

POWER GENERATING SYSTEM AND ITS CONTROL METHOD

TECHNICAL FIELD

The present invention relates to a control method of a power generation system for generating electric power by converting dynamic energy such as wind power or water power into rotational energy, in which a generator can be operated with the maximum efficiency.

RELATED ART

Figure 1:
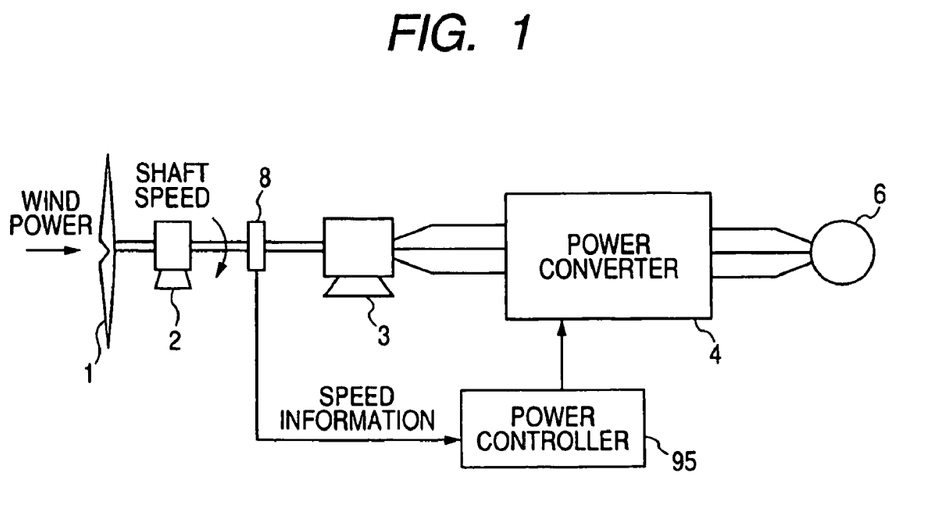
FIG. 1 is a block diagram illustrating a construction of a conventional wind-power generation system.

As an example of a conventional power generation system, a structure of a conventional wind-power generation system is shown in FIG. 1. The conventional wind-power generation system includes a windmill1, a gear/coupling 2 for changing and delivering a shaft speed of the windmill1, a generator 3, a power converter 4, a power controller 95, and a speed sensor 8, and supplies the generated power to a load 6.

Next, operations of the conventional wind-power generation system are described. The wind energy obtained from the rotation of the windmill 1 is subjected to the change of the shaft speed by the gear/coupling 2 and then is delivered to the generator. The generator 3 converts the wind energy into electric energy. The electric energy obtained by the generator 3 is controlled by the power converter 4 and then is delivered to the load 6. The power controller 95 receives information of the shaft speed of the windmill 1 from the speed sensor 8 and controls the power converter 4. An AC generator such as an induced generator and an IPM (Interior Permanent Magnet) generator can be used as the generator 3, in addition to a synchronous generator.

In such a wind-power generation system, the obtained power is affected by a wind speed. The wind speed is not constant but always changes. As a result, in such a wind-power generation system, it is necessary for enhancing generation efficiency to operate the generator 3 at the optimum shaft speed calculated in accordance with the wind speed. Specifically, constant shaft-speed control in which the shaft speed of the generator 3 does not change in accordance with the wind speed or variable shaft-speed control in which the energy efficiency, that is, the generation efficiency, is enhanced by changing the shaft speed of the generator 3 in accordance with the wind speed is performed by the power controller 95.

Since it is necessary for performing the constant shaft-speed control or the variable shaft-speed control to detect the speed of a shaft, the speed sensor 8 such as an encoder for detecting the shaft speed is used in the conventional wind-power generation system. For example, a wind-power generation system employing an encoder for detecting the shaft speed of the windmill is disclosed in Japanese Unexamined Patent Application Publication No. 2002-84797.

However, in the conventional wind-power generation system provided with the speed sensor 8 such as an encoder for detecting the shaft speed of the windmill, it is necessary to provide a wire from the speed sensor 8 to the power controller 95. As a result, when the distance from the speed sensor 8 to the power controller 95 is increased, the wire should be elongated, thereby causing a problem with deterioration in reliability due to disconnection of the wire, etc. In addition, since the speed sensor is always rotated during rotation of the windmill, the lifetime of the speed sensor per se causes the problem with deterioration in reliability. The installation of the speed sensor also causes a problem with increase in cost.

Although the wind-power generation system employing the windmill as a turbine has been described here, the same problems may be caused in power generation systems for generating electric power by converting dynamic energy into rotational energy using a turbine other than the windmill.

DISCLOSURE OF THE INVENTION

An object of the present invention is to provide a power generation system and a control method thereof, in which it is possible to accomplish high reliability, simplification of circuits, and reduction of cost by acquiring speed information from a generator without using a speed sensor for detecting a shaft speed of a turbine. Another object of the present invention is to realize high-efficiency operation without using means for detecting an energy quantity of a dynamic power source, such as a wind speed sensor.

In order to accomplish the above-mentioned objects, according to an aspect of the present invention, there is provided a power generation system having a turbine for converting dynamic energy into rotational energy, a generator for converting the rotational energy of the turbine into electric energy, a power controller for performing power control of the electric energy obtained by the generator, and a power converter for controlling input power and output power in accordance with an instruction from the power controller, wherein the power controller includes: a three-two phase converter for calculating a two-phase current and a two-phase voltage by converting an output voltage and an output current of the generator into a stationary d-q coordinate system; a generator output calculator for calculating an output of the generator from the two-phase current and the two-phase voltage calculated by the three-two phase converter; an induced voltage detector for detecting an induced voltage from the two-phase current and the two-phase voltage calculated by the three-two phase converter; a phase detector for detecting a phase of the induced voltage from the induced voltage detected by the induced voltage detector; a differentiator for calculating a rotational speed of the induced voltage by differentiating the phase of the induced voltage detected by the phase detector and estimating a shaft speed of the generator; and a turbine output calculator for calculating an output of the turbine by using the estimated shaft speed value estimated by the differentiator and the output of the generator calculated by the generator output calculator.

According to another aspect of the present invention, there is provided a power generation system having a turbine for converting dynamic energy into rotational energy, a generator for converting the rotational energy of the turbine into electric energy, a power controller for performing power control of the electric energy obtained by the generator, and a power converter for controlling input power and output power in accordance with an instruction from the power controller, wherein the power controller includes: a three-two phase converter for calculating a two-phase current and a two-phase voltage by converting an output voltage and an output current of the generator into a stationary d-q coordinate system; a generator output calculator for calculating an output of the generator from the two-phase current and the two-phase voltage calculated by the three-two phase converter; a rotor magnetic-flux detector for detecting rotor magnetic flux from the two-phase current and the two-phase voltage calculated by the three-two phase converter; a phase detector for detecting a phase of the rotor magnetic flux from the rotor magnetic flux detected by the rotor magnetic-flux detector; a differentiator for calculating a rotational speed of the rotor magnetic flux by differentiating the phase of the rotor magnetic flux detected by the phase detector and estimating a shaft speed of the generator; and a turbine output calculator for calculating an output of the turbine by using the estimated shaft speed value estimated by the differentiator and the output of the generator calculated by the generator output calculator.

According to the present invention, since the induced voltage or the rotor magnetic flux is calculated from the output voltage and the output current of the generator, the shaft speed of the generator is estimated from the phase of the induced voltage or the phase of the rotor magnetic flux, and the output of the turbine is calculated from the estimated shaft speed value and the output of the generator, it is possible to calculate the output of the turbine without using a speed sensor for detecting the shaft speed of the generator and thus to accomplish simplification of circuits, reduction in cost, and high reliability.

In the power generation system according to the present invention, the power controller may further include a turbine torque estimator for calculating a torque of the turbine from the output of the turbine calculated by the turbine output calculator and the estimated shaft speed value; and a maximum-efficiency operation controller for calculating a shaft speed instruction value from the torque of the turbine calculated by the turbine torque estimator.

According to the present invention, since the power input to the generator and the torque of the turbine are calculated from the output of the turbine and the estimated shaft speed value, the shaft speed instruction with which the efficiency of the generator becomes the maximum is calculated using the calculated torque of the turbine, the estimated shaft speed value, and the output coefficient of the turbine, and the shaft speed of the generator is controlled to correspond to the shaft speed instruction, it is possible to always perform the operation with the maximum efficiency of the input energy.

In addition, the maximum-efficiency operation controller may include: a torque variation calculator for sampling the torque of the turbine calculated by the turbine torque estimator at constant time intervals and calculating $(T_{tur}(n)-T_{tur}(n-1))/t_s$ to calculate the torque variation $\Delta T_{tur}(n)/t_s$, where a current torque of the turbine is $T_{tur}(n)$, a previous torque of the turbine is $T_{tur}(n-1)$, and the torque variation is $t_s$; an output-coefficient differential equation calculator for calculating a solution of a relational expression of an output coefficient determined depending upon characteristics of the turbine and the torque variation $\Delta T_{tur}(n)/t_s$; and a generation rate instruction unit for calculating the shaft speed instruction value on the basis of the solution obtained by the output-coefficient differential equation calculator.

In the power generation system according to the present invention, the power controller may further include: a micro correction controller having an output variation calculator for sampling the output of the turbine calculated by the turbine output calculator at constant time intervals and calculating a difference $\Delta P(n)$ between a current output of the turbine $P_{tur}(n)$ and a previous output of the turbine $P_{tur}(n-1)$, a proportional gain multiplier for calculating a micro speed instruction value by multiplying the difference $\Delta P(n)$ calculated by the output variation calculator by a proportional gain, and a limiter for limiting the absolute value of the micro speed instruction value calculated by the proportional gain multiplier to a predetermined limitation value; and an adder for adding the micro speed instruction value calculated by the micro correction controller to the shaft speed instruction value calculated by the maximum-efficiency operation controller and outputting the added value as a new shaft speed instruction value.

According to the present invention, since the micro speed instruction is calculated from the output variation of the turbine and is added to the speed instruction, it is possible to obtain both the fast transient response characteristic and the stable micro adjustment and it is thus possible to always obtain the maximum efficiency when design values and actual values are different from each other.

BEST MODE FOR CARRYING OUT THE INVENTION

Next, embodiments of the present invention will be described in detail with reference to the attached drawings.

First, a relation of a wind speed and a shaft speed for maximizing efficiency of a generator in the present invention will be described.

<Output Characteristic of General Windmill>

The output $P_{tur}$ of a windmill can be generally expressed by Equation 1 described below.

$$P_{tur}=c_p k_{sys} V^3_{wind} \quad (1)$$

In Equation 1, the windmill constant $k_{sys}$ is a constant determined from the area of windmill fliers and the air density, but not a parameter which suddenly varies at the time of control. The wind speed $V_{wind}$ is a parameter which cannot be controlled. The circumferential speed ratio $\lambda$ of the wind speed $V_{wind}$ and the shaft speed $W_{gen}$ can be expressed by Equation 2 described below using the gear ratio $k_c$ of a generator and a windmill and the radius $R_v$ of the windmill.

$$\lambda = R_v k_c \frac{W_{gen}}{V_{wind}} \quad (2)$$

Figure 2:
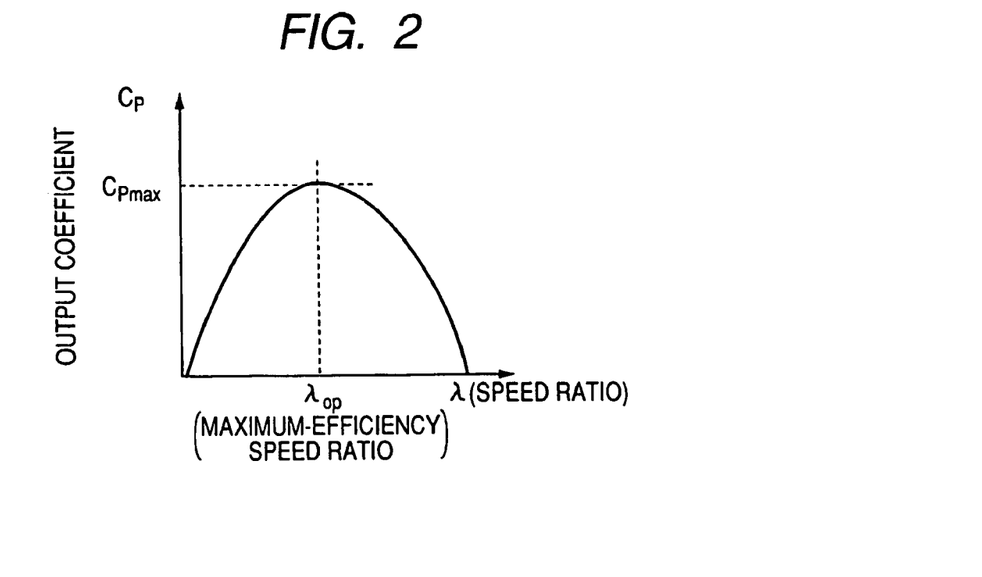
FIG. 2 is a graph illustrating relations of an output coefficient and a speed ratio.

The dynamic power coefficient $C_p$ is a parameter which can vary by the circumferential speed ratio $\lambda$ as shown in FIG. 2. Accordingly, since the dynamic power coefficient $C_p$ becomes the maximum value $C_p(\max)$ by controlling $\lambda$ during power generation to maintain the maximum-efficiency speed ratio $\lambda_{op}$, the system can be operated with the maximum efficiency. $\lambda$op is a constant determined from design of the windmill. In order to maintain the maximum efficiency operation, the shaft speed instruction $W^*_{gen}$ of the generator is obtained and output from Equation 3 described below.

$$W^*_{gen} = \left(\frac{\lambda_{op}}{R_v k_c}\right) V_{wind} \quad (3)$$

In Equation 3, $\lambda_{op}$, $R_v$, and $k_c$ can be known since they are parts of the designed values of the windmill, but the wind speed $V_{wind}$ is an unknown value. Accordingly, an instantaneous value of the wind speed $V_{wind}$ is necessary for performing the maximum efficiency operation.

The power $P_{gen}$ of the generator can be expressed as shown in Equation 4 described below using the shaft speed $W_{gen}$ of the generator and the torque $T_{gen}$ of the generator.

$$P_{gen} = W_{gen} T_{gen} \quad (4)$$

Alternatively, the power $P_{gen}$ of the generator may be calculated by Equation 5 using a two-phase voltage and a two-phase current in a stationery d-q coordinate system of the generator.

$$P_{gen} = \frac{3}{2}(V_{ds}I_{ds} + V_{qs}I_{qs}) \quad (5)$$

The loss $P_{loss}$ of the windmill system consists of an electrical loss and a mechanical loss. The electrical loss is obtained by multiplying the generator power $P_{gen}$ by an electrical loss constant $k_1$ which is determined by means of an equivalent resistance of the generator and a switching frequency of a power semiconductor in an inverter for controlling the generator. The mechanical loss is obtained by multiplying the square of the generator shaft speed $W_{gen}^2$ by a mechanical friction constant $B_{sys}$. The loss $P_{loss}$ of the windmill system is obtained as shown in Equation 6 described below by adding the mechanical loss to the electrical loss.

$$P_{loss} = k_1 P_{gen} + B_{sys} W_{gen}^2 \quad (6)$$

The output of the windmill $P_{tur}$ is obtained from Equation 7 described below by adding the output loss $P_{loss}$ to the obtained generator power $P_{gen}$.

$$P_{tur} = P_{gen} + P_{loss} \quad (7)$$

The wind speed can be obtained from the obtained output of the windmill $P_{tur}$, the generator shaft speed, and the windmill data. In the present invention, using the estimated shaft speed $$\hat{W}_{gen}$$

As the generator shaft speed, the output of the windmill $P_{tur}$ is obtained.

<Maximum Output Point of Windmill>

Figure 3:
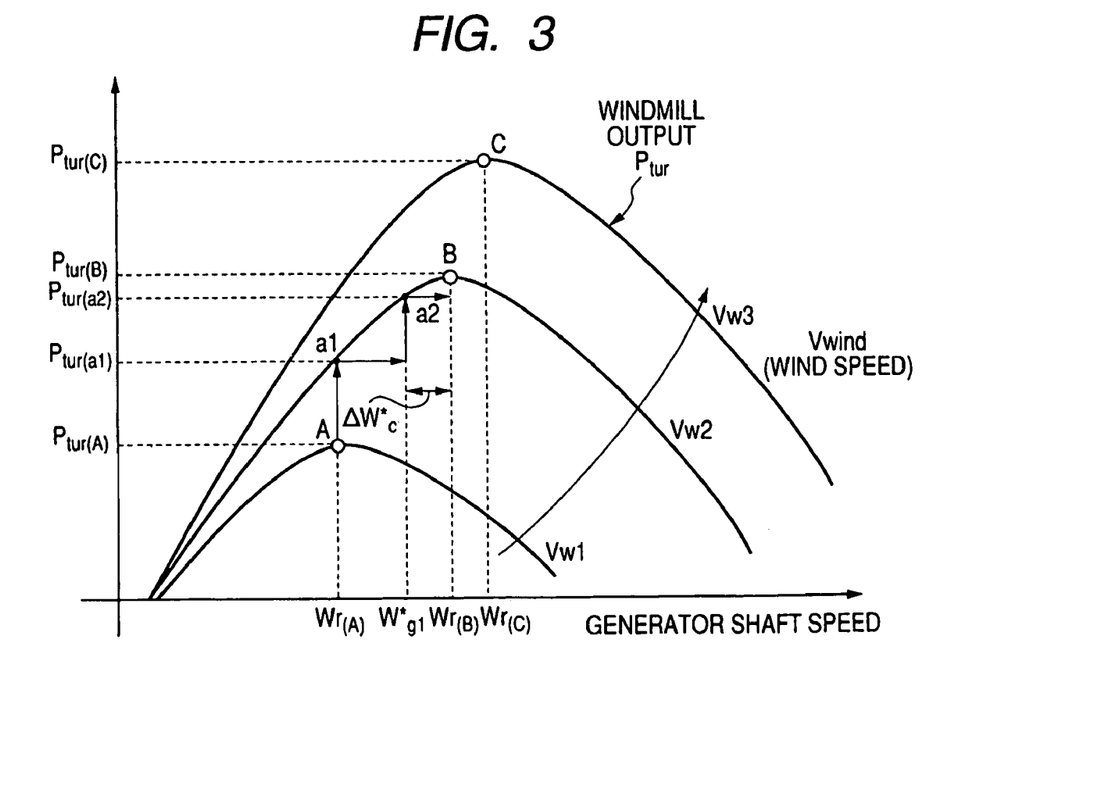
FIG. 3 is a graph illustrating relations of an output of a windmill, a shaft speed of a generator, and a wind speed.

In general, the maximum output point exists between the shaft speed of the generator and the wind speed. For example, as shown in FIG. 3, when the generator shaft speed $W_{gen}$ is Wr(A) and the wind speed $V_{wind}$ is Vw1, the maximum output point of the windmill is $P_{tur}(A)$. When the generator shaft speed $W_{gen}$ is Wr(B) and the wind speed Vwind is Vw2, the maximum output point of the windmill is $P_{tur}(B)$.

<Principle of Transient Response Control>

Next, a principle of transient response control will be described.

In general, the torque $T_{tur}$ of a windmill can be expressed by Equation 8 described below.

$$T_{tur} = P_{tur}/k_c W_{gen} \quad (8)$$

In the construction having a function of controlling a speed such that the generator shaft speed follow the generator shaft speed instruction, when the shaft speed instruction is constant, the differential value of torque to time can be expressed by Equation 9 described below.

$$\frac{dT_{tur}}{dt} = \frac{\pi}{2k_c} \rho R_v^5 W_{gen}^2 \frac{d}{dt}\left(\frac{c_p}{\lambda^3}\right) \quad (9)$$

In Equation 9, $\rho$ denotes an air density. When the control period $t_s$ of the speed controller is small, Equation 9 can be expressed by Equation 10 described below using the torque variation $\Delta T_{tur}$ which is the output of the speed controller.

$$\frac{d}{dt}\left(\frac{c_p}{\lambda^3}\right) = \frac{2k_c}{\pi \rho R_v^5 W_{gen}^2} \frac{\Delta T_{tur}}{t_s} \quad (10)$$

In general, the output coefficient $C_p$ of the windmill is an m-th order polynomial of $\lambda$ and can be expressed by Equation 11.

$$C_p(\lambda) = C_0 + C_1\lambda + C_2\lambda^2 + \ldots + C_m\lambda^m \quad (11)$$

$C_0$ to $C_n$ of Equation 11 are known constants determined through the design of the windmill. By inserting $C_p(\lambda)$ of Equation 11 into Equation 10 and arranging Equation 10, Equation 12 described below can be obtained.

$$\frac{d}{dt}\{c_0\lambda^{-3} + c_1\lambda^{-2} + c_2\lambda^{-1} + \ldots + c_m\lambda^{m-3}\} - \frac{2k_c}{\pi \rho R_v^5} \frac{1}{W_{gen}^2} \frac{\Delta T_{tur}}{t_s} = 0 \quad (12)$$

Here, by replacing $\lambda-1$ with x and arranging Equation 12, Equation 13 can be obtained.

$$3c_0 x^2 + 2c_1 x + \left(c_2 - \frac{2k_c}{\pi \rho R_v^5} \frac{1}{W_{gen}^2} \frac{\Delta T_{tur}}{t_s}\right) + \ldots + c_m \frac{d}{dt}(x^{3-m}) = 0 \quad (13)$$

When the solution of Equation 13 is $$\hat{x},$$

the wind speed can be estimated as shown as Equation 14 described below.

$$\hat{V}_{wind} = R_v k_c \hat{W}_{gen} \hat{x} \quad (14)$$

Finally, by using the estimated shaft speed value $$\hat{W}_{gen}$$

instead of the generator shaft speed, the shaft speed instruction of the generator can be expressed by Equation 15.

$$W^*_{g1} = \lambda_p \hat{W}_{gen} \hat{x} \quad (15)$$

Therefore, on the basis of the output coefficient $C_p$ of the windmill and the shaft speed and torque of the generator, the solution of the differential equations indicated by Equations 10 to 15 can be obtained, thereby calculating the shaft speed instruction $W^*_{g1}$ of the generator.

<Principle of Micro Correction Control>

In the above-mentioned description, it has been explained to detect the wind speed from the torque variation, to calculate the shaft speed instruction, and to control the generation efficiency. Next, a principle of the micro correction control method for enhancing the accuracy of the efficient operation control without variation of constants in the wind-power generation system such as an error of the dynamic power coefficient $C_p$ will be described with reference to FIG. 3.

Initially, it is supposed that the windmill is operated at the point A in FIG. 3. Since the shaft speed instruction is yet constant even when the wind speed changes from Vw1 to Vw2, the shaft speed does not change from Wr(A) and only the torque changes, so that the operation point shifts from A to a1. In Equations 11 to 15, the transient response control is carried out by determining the change of the wind speed from the change of the torque and outputting the shaft speed instruction $W^*_{g1}$ of the generator. However, even when the shaft speed of the generator follows the shaft speed instruction $W^*_{g1}$, the actual operation point a2 may not correspond to the new maximum-efficiency operation point B because of variation and error of the constants of the power generation system. In order to solve this problem, the micro correction control is performed in the present invention. Supposed that the current detected power is $P_{tur}(n)$ and the previous detected power is $P_{tur}(n-1)$ Equation 16 described below is obtained.

$$\Delta P(n) = P_{tur}(n) - P_{tur}(n-1)$$

$$\Delta W^*_1(n) = k_{pw} \cdot \Delta P(n) \quad (16)$$

Here, $k_{pw}$ is a proportional gain. In order to limit the maximum value of the corrected value, the absolute value of $\Delta W^*_1(n)$ is limited to a value less than or equal to a limitation value $$W_c\text{-lim}$$

as expressed by Equation 17 described below. The micro correction control can be carried out by the correction of the generator shaft speed.

if $\Delta W^*_1(n) > W_c\text{-lim} \Delta W^*_c = W_c\text{-lim}$ if $\Delta W^*_1(n) < -W_c\text{-lim} \Delta W^*_c = -W_c\text{-lim}$ else $\Delta W^*_c = \Delta W^*_1(n)$ (17)

Consequently, the generator shaft speed instruction can be expressed by Equation 18.

$$W^*_{gen} = W^*_{g1} + \Delta W^*_c \quad (18)$$

<Speed Estimation Method>

Next, a principle of a shaft speed estimation method will be described.

By transforming the detected output current value of the generator $$\hat{I}_u, \hat{I}_w$$

and the detected phase voltage of the generator obtained from direct detection of the three-phase output voltage or the voltage instruction value $$\hat{V}_u, \hat{V}_w$$

into the stationery d-q coordinate system established at a position of a stator from the three-phase coordinate system, the two-phase current $$\hat{I}_{ds}, \hat{I}_{qs}$$

is obtained from Equation 19 described below, and the two-phase voltage $$\hat{V}_{ds}, \hat{V}_{qs}$$

is obtained from Equation 20 described below. Here, $C_0$ is a constant.

$$\begin{bmatrix} \hat{I}_{ds} \\ \hat{I}_{qs} \end{bmatrix} = c_0 \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} \hat{I}_u \\ -(\hat{I}_u + \hat{I}_w) \\ \hat{I}_w \end{bmatrix} \quad (19)$$

$$\begin{bmatrix} \hat{V}_{ds} \\ \hat{V}_{qs} \end{bmatrix} = c_0 \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} \hat{V}_u \\ -(\hat{V}_u + \hat{V}_w) \\ \hat{V}_w \end{bmatrix} \quad (20)$$

<Embodiment 1 of Speed Estimation>

The induced voltage of a permanent magnet type synchronous generator can be obtained from Equation 21 described below.

$$\hat{E}_{ds} = \hat{V}_{ds} + (R_{ds} + pL_{ds})\hat{I}_{ds}$$

$$\hat{E}_{qs} = \hat{V}_{qs} + (R_{qs} + pL_{qs})\hat{I}_{qs} \quad (21)$$

Here, $R_{ds}$ and $R_{qs}$ denote equivalent resistances of the stator sides in the d axis and the q axis, p denotes a differentiator, and $L_{ds}$ and $L_{qs}$ denote inductances of the d axis and the q axis. In general, the induced voltages $E_{ds}$ and $E_{qs}$ of the d axis and the q axis in a three-phase symmetric AC generator have features expressed in Equation 22 described below.

$$E_{ds} = K_e W_e \sin \theta_e$$

$$E_{qs} = K_e W_e \cos \theta_e \quad (22)$$

Here, $K_e$ is a voltage coefficient determined from the rated voltage of the generator, $W_e$ is an electrical angular speed of the generator, and $\theta_e$ is a phase of the induced voltage. Accordingly, the estimated phase value of the induced voltage of the generator can be obtained from Equation 23 described below.

$$\hat{\theta}_e = \tan^{-1}(\hat{E}_{ds}/\hat{E}_{qs}) \quad (23)$$

The shaft speed of the generator can be obtained from Equation 24 described below by differentiating the estimated phase value of magnetic flux.

$$\hat{W}_{gen} = \frac{2}{\text{Pole}} \frac{d\hat{\theta}_e}{dt} \quad (24)$$

Here, pole is the number of poles of the generator.

<Embodiment 2 of Speed Estimation>

In the permanent magnet type synchronous generator, the magnetic flux of the rotor side in the stationery d-q coordinate system can be obtained from Equation 25 described below.

$$\hat{\Phi}_d = \int (\hat{V}_{ds} + (R_{ds} + pL_{ds})\hat{I}_{ds})dt$$

$$\hat{\Phi}_q = \int (\hat{V}_{qs} + (R_{qs} + pL_{qs})\hat{I}_{qs})dt \quad (25)$$

In general, the rotor magnetic fluxes Φd and Φq of the three-phase symmetric AC generator have features shown in Equation 26.

$$\hat{\Phi}_d = k_\Phi \sin \theta_\Phi$$

$$\hat{\Phi}_q = k_\Phi \cos \theta_\Phi \quad (26)$$

Here, $k_\Phi$ is a magnetic flux coefficient and $\theta_\Phi$ is a phase of the magnetic flux. Accordingly, the estimated phase value of the magnetic flux of the generator can be obtained from Equation 27 described below.

$$\hat{\theta}_e = \tan^{-1}(\hat{\Phi}_{ds}/\hat{\Phi}_{qs}) \quad (27)$$

The shaft speed of the generator can be obtained from Equation 28 described below by differentiating the estimated phase value of the magnetic flux.

$$\hat{W}_{gen} = \frac{2}{\text{Pole}} \frac{d\hat{\theta}_\Phi}{dt} \quad (28)$$

Figure 4:
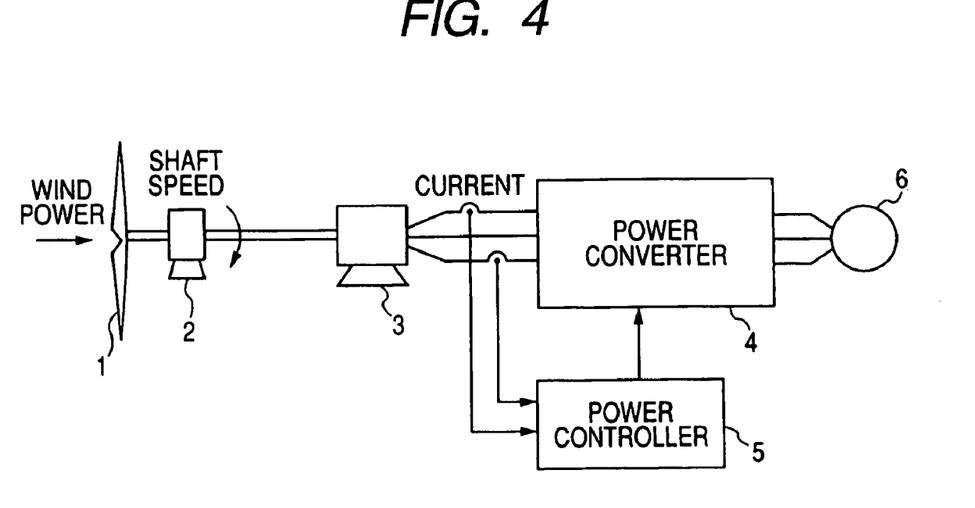
FIG. 4 is a block diagram illustrating a construction of a wind-power generation system according to an embodiment of the present invention.

Next, a specific construction of a power generation system according to an embodiment of the present invention is shown in FIG. 4, which embodies the control method described above.

FIG. 4 illustrates an embodiment in which the present invention is applied to a wind-power generation system. In FIG. 4, the same elements as those of FIG. 1 are denoted by the same reference numerals and descriptions thereof will be omitted.

The wind-power generation system according to the present embodiment has a construction that the speed sensor 8 for detecting the shaft speed is removed from the conventional wind-power generation system shown in FIG. 1 and the power controller 95 thereof is replaced with a power controller 5. The power controller 5 in the present embodiment has a function of controlling the power and the shaft speed of a generator and a generator shaft-speed estimation function of detecting a current value and a voltage value of the generator and estimating the shaft speed of the generator on the basis of the current value and the voltage value.

Figure 5:
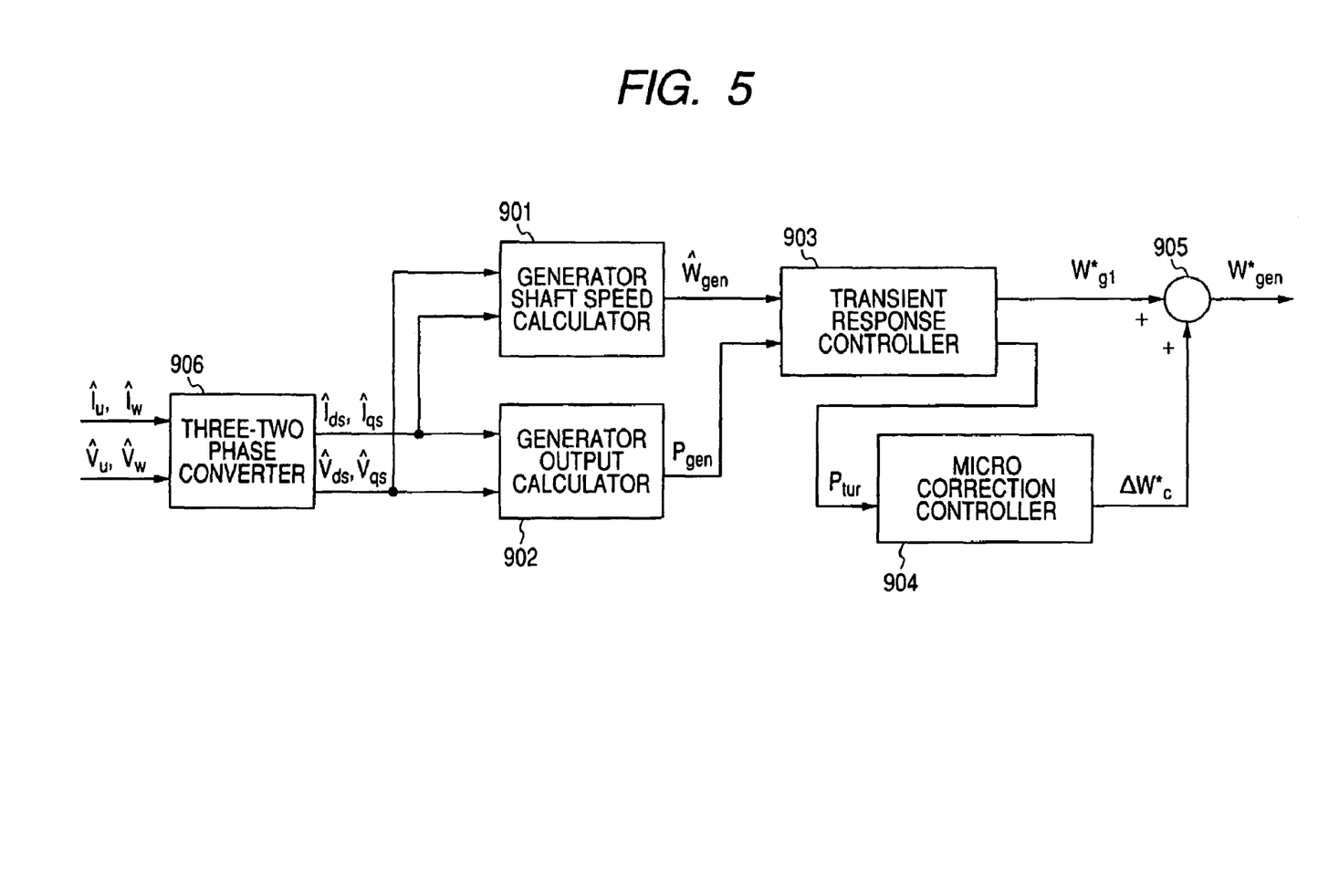
FIG. 5 is a block diagram illustrating constituent elements for performing a function of calculating a shaft speed instruction $W^*_{gen}$ for carrying out maximum-efficiency operation control from a current value and a voltage value of a generator 3 in a power controller 5 shown in FIG. 4.

In the power controller 5 shown in FIG. 4, the constituent section for performing the function of obtaining a shaft speed instruction $W^*_{gen}$ for giving the maximum-efficiency operation control from the current value and the voltage value of the generator is illustrated in FIG. 5.

As shown in FIG. 5, the function of giving the maximum-efficiency operation control is performed by a three-two phase converter 906, a generator shaft-speed calculator 901, a generator output calculator 902, a transient response controller 903, a micro correction controller 904, and an adder 905.

The three-two phase converter 906 converts the output voltage and the output current of the generator 3 into a stationery d-q coordinate system and calculates a two-phase current $$\hat{I}_{ds}, \hat{I}_{qs}$$

and a two-phase voltage $$\hat{V}_{ds}, \hat{V}_{qs}$$

by using Equations 19 and 20 described above.

The generator output calculator 902 calculates the output $P_{gen}$ of the generator 3 from the two-phase current and the two-phase voltage calculated by the three-two phase converter 906.

Figure 6:
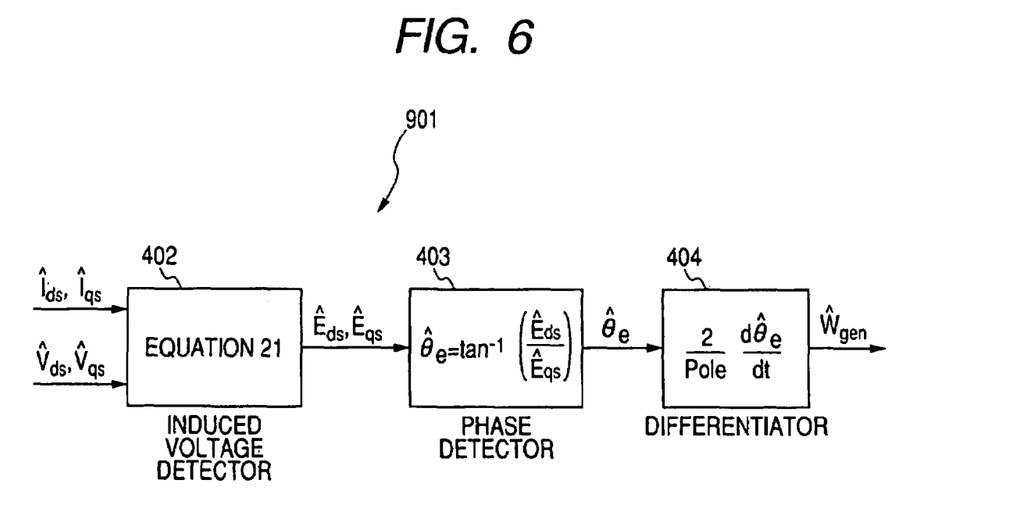
FIG. 6 is a block diagram illustrating an example of a construction of a generator shaft-speed calculator in FIG. 5.

Next, an example of a specific construction of the generator shaft-speed calculator 901 is shown in FIG. 6. In the example shown in FIG. 6, the generator shaft-speed calculator 901 includes an induced voltage detector 402, a phase detector 403, and a differentiator 404. This example corresponds to Embodiment 1 of the speed estimation described above.

The induced voltage detector 402 detects the induced voltage $$\hat{E}_{ds}, \hat{E}_{qs}$$

from the two-phase current and the two-phase voltage from the three-two phase converter 906 by using Equation 21 described above.

The phase detector 403 detects the phase of the induced voltage $$\hat{\theta}_e$$

from the induced voltage detected by the induced voltage detector 402 using Equation 23 described above.

The differentiator 404 calculates the estimated shaft speed value which is the rotational speed of the induced voltage, that is, the estimated shaft speed value of the generator 3 by differentiating the estimated phase value of the induced voltage detected by the phase detector using Equation 24 described above.

Figure 7:
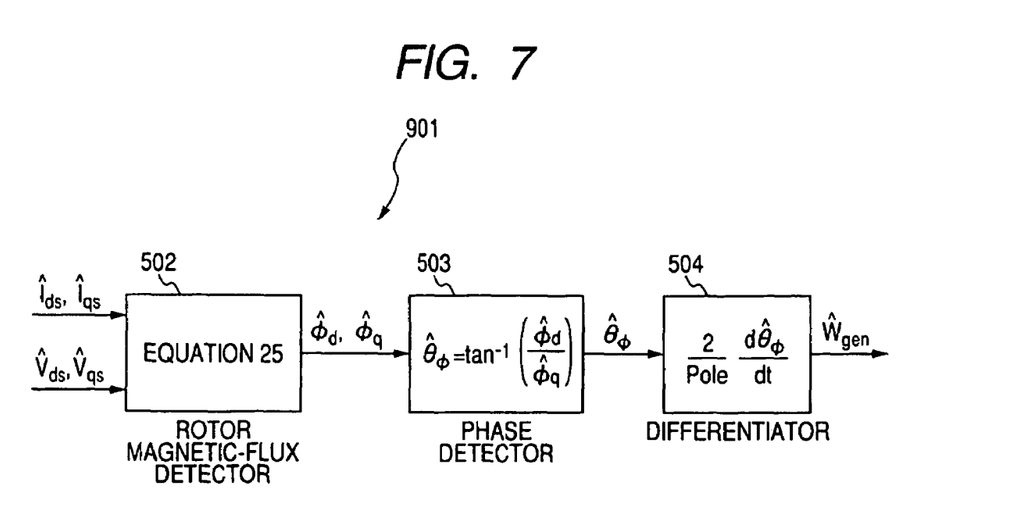
FIG. 7 is a block diagram illustrating another example of the construction of the generator shaft-speed calculator 901 in FIG. 5.

Another example of the specific construction of the generator shaft-speed calculator 901 shown in FIG. 5 is illustrated in FIG. 7. In the example shown in FIG. 7, the generator shaft-speed calculator 901 includes a rotor magnetic-flux detector 502, a phase detector 503, and a differentiator 504. This example corresponds to Embodiment 2 of speed estimation described above.

The rotor magnetic-flux detector 502 detects the rotor magnetic flux $$\hat{\Phi}_d, \hat{\Phi}_q$$

from the two-phase current $$\hat{I}_{ds}, \hat{I}_{qs}$$

and the two-phase voltage $$\hat{V}_{ds}, \hat{V}_{qs}$$

which are converted into the stationery d-q coordinate system by the three-two phase converter 906 shown in FIG. 5 using Equation 25 described above.

The phase detector 503 detects the phase of the rotor magnetic flux $$\hat{\theta}_\Phi$$

from the rotor magnetic flux detected by the rotor magnetic-flux detector 502.

The differentiator 504 calculates the estimated rotational speed of the rotor magnetic flux, that is, the estimated shaft speed of the generator 3, from the phase of the rotor magnetic flux detected by the phase detector 503 using Equation 28 described above.

Figure 8:
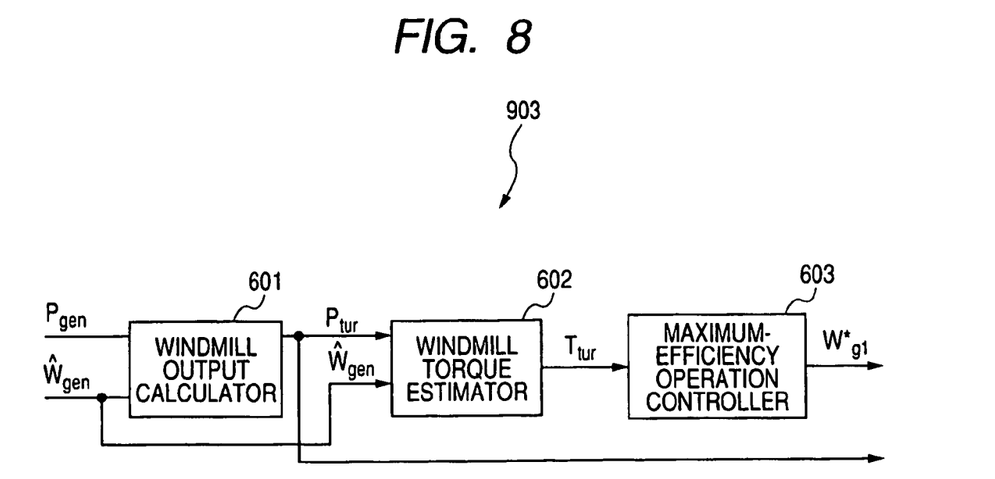
FIG. 8 is a block diagram illustrating a construction of a transient response controller 903 in FIG. 5.

Next, a specific construction of the transient response controller 903 of FIG. 5 is illustrated in FIG. 8. As shown in FIG. 8, the transient response controller 903 includes a windmill output calculator 601, a windmill torque estimator 602, and a maximum-efficiency operation controller 603.

The windmill output calculator 601 serves as a turbine output calculator, and calculates the windmill output $P_{tur}$ from Equation 7 using the estimated shaft speed value of the generator 3

$$\hat{W}_{gen}$$

calculated by the generator shaft-speed calculator 901 shown in FIG. 6 or 7 and the generator output $P_{gen}$ calculated by the generator output calculator 902.

The windmill torque estimator 602 serves as a turbine torque estimator, and calculates the windmill torque $T_{tur}$ from Equation 8 using the windmill output $P_{tur}$ calculated by the windmill output calculator 601 and the estimated shaft speed value $$\hat{W}_{gen}$$

calculated by the generator shaft-speed calculator 901.

Figure 9:
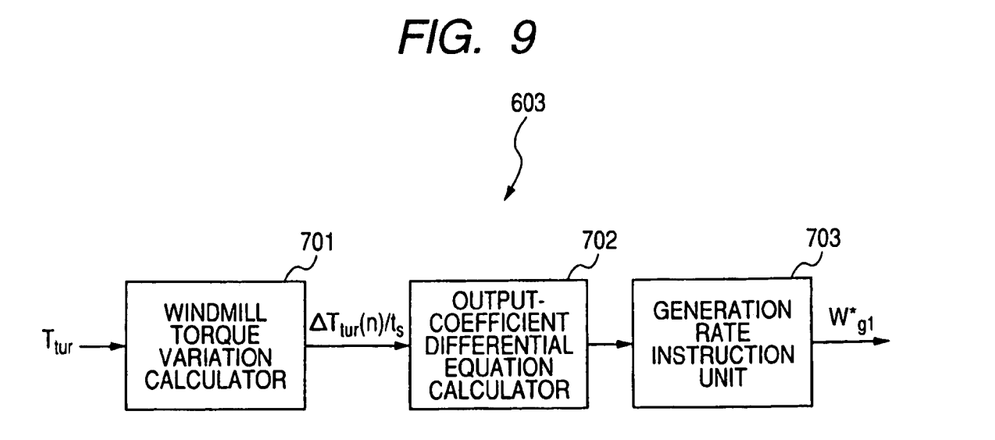
FIG. 9 is a block diagram illustrating a construction of a maximum-efficiency operation controller 603 in FIG. 8.

The maximum-efficiency operation controller 603 calculates the shaft speed instruction value $W^*_{g1}$ from the windmill torque $T_{tur}$ calculated by the windmill torque estimator 602. A specific construction of the maximum-efficiency operation controller 603 is illustrated in FIG. 9. The maximum-efficiency operation controller 603 includes a windmill-torque variation calculator 701, an output-coefficient differential equation calculator 702, and a generation rate instruction unit 703, as shown in FIG. 9.

The maximum-efficiency operation controller 603 samples the windmill torque $T_{tur}$ at constant time intervals and performs the calculations. Here, it is supposed that the sampling interval is denoted by $t_s$, the torque at the time of the current sampling is denoted by $T_{tur}(n)$, and the torque at the time of the previous sampling is denoted by $T_{tur}(n-1)$ The windmill-torque variation calculator 701 obtains the torque variation $\Delta T_{tur}(n)/t_s$ by calculating $(T_{tur}(n)-T_{tur}(n-1))/t_s$. The output-coefficient differential equation calculator 702 calculates the solution of a relational expression of the output coefficient $C_p(\lambda)$ in Equation 13 determined depending upon characteristics of the windmill and $\Delta T_{tur}(n)$, and the generation rate instruction unit 703 calculates the shaft-speed instruction value $W^*_{g1}$ from Equation 15.

Figure 10:
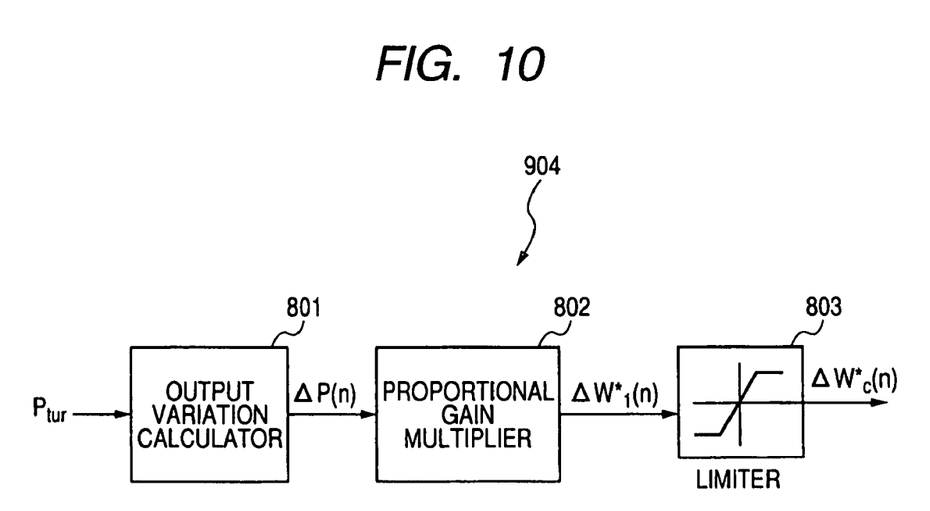
FIG. 10 is a block diagram illustrating a construction of a micro correction controller 904 in FIG. 5.

Next, a specific construction of the micro correction controller 904 of FIG. 5 is illustrated in FIG. 10. The micro correction controller 904 includes an output variation calculator 801, a proportional gain multiplier 802, and a limiter 803, as shown in FIG. 10.

The output variation calculator 801 samples the windmill output $P_{tur}$ calculated by the windmill output calculator 601 at constant time intervals, and calculates a difference $\Delta P(n)$ between the current windmill output $P_{tur}(n)$ and the previous windmill output $P_{tur}(n-1)$ using the upside equation in Equation 16. The proportional gain multiplier 802 outputs a micro speed instruction value $\Delta W^*_c(n)$ obtained by limiting the absolute value of a micro speed instruction value $\Delta W^*_1(n)$ to a limitation value $$W_c\text{-lim}$$

by multiplying the proportional gain $k_{pw}$ by $\Delta P(n)$ calculated by the output variation calculator 801 using the downside equation in Equation 16.

The adder 905 outputs a new shaft speed value $W^*_{gen}$ by adding the micro speed instruction $\Delta W^*_c$ limited by the limiter 803 of the micro correction controller 904 to the shaft speed instruction value $W^*_{g1}$ calculated by the maximum-efficiency operation controller 603 of the transient response controller 903.

According to the power generation system of the present embodiment, since the micro speed instruction $\Delta W^*_c$ is calculated from the variation of the windmill output $P_{tur}$ and is added to the shaft speed instruction $W^*_{g1}$, it is possible to calculate the shaft speed instruction $W^*_{gen}$ which can obtain both of the fast transient response characteristic and the stable micro adjustment and it is thus possible to always obtain the maximum efficiency when the design values and the actual values are different from each other.

According to the power generation system of the present embodiment, since the power input to the generator and the windmill torque are calculated from the windmill output and the estimated shaft speed value, the shaft speed instruction with which the generator efficiency becomes the maximum is calculated using the calculated windmill torque, the estimated shaft speed value, and the windmill output coefficient, and it is controlled such that the shaft speed of the generator is equal to the shaft speed instruction, it is possible to always perform the operation with the maximum efficiency for input energy.

According to the wind-power generation system and the control method of the present embodiment, it is possible to enhance the efficiency of the generator 3 and in addition to control the power with external dynamic power without using the speed sensor and the wind speed sensor of the generator 3 which is usually expensive, thereby obtaining the simplification of circuits, the reduction in cost, and the high reliability.

In the present embodiment, although it has been described that the present invention has been applied to the wind-power generation system for generating electric power using wind power, the present invention is not limited to this, but may be applied to a system in which the turbine and the fluid converting the dynamic energy into the rotational energy have the relation shown in FIG. 3, for example, a water-power generation system, and the like.

The invention claimed is:

1. A power generation system comprising:
   a turbine for converting dynamic energy into rotational energy,
   a generator for converting the rotational energy of the turbine into electric energy,
   a power controller for performing power control of the electric energy obtained by the generator, and a power converter for controlling input power and output power in accordance with an instruction from the power controller, wherein the power controller includes:
a three-two phase converter for calculating a two-phase current and a two-phase voltage by converting an output voltage and an output current of the generator into a stationary d-q coordinate system;
a generator output calculator for calculating an output of the generator from the two-phase current and the two-phase voltage calculated by the three-two phase converter;
an induced voltage detector for detecting an induced voltage from the two-phase current and the two-phase voltage calculated by the three-two phase converter;
a phase detector for detecting a phase of the induced voltage from the induced voltage detected by the induced voltage detector;
a differentiator for calculating a rotational speed of the induced voltage by differentiating the phase of the induced voltage detected by the phase detector and estimating a shaft speed of the generator; and
a turbine output calculator for calculating an output of the turbine by using the estimated shaft speed value estimated by the differentiator and the output of the generator calculated by the generator output calculator.

2. The power generation system according to claim 1, wherein the power controller further comprises:
a turbine torque estimator for calculating a torque of the turbine from the output of the turbine calculated by the turbine output calculator and the estimated shaft speed value; and
a maximum-efficiency operation controller for calculating a shaft speed instruction value from the torque of the turbine calculated by the turbine torque estimator.

3. The power generation system according to claim 2, wherein the maximum-efficiency operation controller comprises:
a torque variation calculator for sampling the torque of the turbine calculated by the turbine torque estimator at constant time intervals and calculating $(T_{tur}(n)-T_{tur}(n-1))/t_s$ to calculate the torque variation $\Delta T_{tur}(n)/t_s$, where a current torque of the turbine is $T_{tur}(n)$, a previous torque of the turbine is $T_{tur}(n-1)$, and the torque variation is $t_s$;
an output-coefficient differential equation calculator for calculating a solution of a relational expression of an output coefficient determined depending upon characteristics of the turbine and the torque variation $\Delta T_{tur}(n)/t_s$; and
a generation rate instruction unit for calculating the shaft speed instruction value on the basis of the solution obtained by the output-coefficient differential equation calculator.

4. The power generation system according to claim 2, wherein the power controller further comprises:
a micro correction controller including an output variation calculator for sampling the output of the turbine calculated by the turbine output calculator at constant time intervals and calculating a difference $\Delta P(n)$ between a current output of the turbine $P_{tur}(n)$ and a previous output of the turbine $P_{tur}(n-1)$, a proportional gain multiplier for calculating a micro speed instruction value by multiplying the difference $\Delta P(n)$ calculated by the output variation calculator by a proportional gain, and a limiter for limiting the absolute value of the micro speed instruction value calculated by the proportional gain multiplier to a predetermined limitation value; and
an adder for adding the micro speed instruction value calculated by the micro correction controller to the shaft speed instruction value calculated by the maximum-efficiency operation controller and outputting the added value as a new shaft speed instruction value.

5. A control method of a power generation system comprising:
a turbine for converting dynamic energy into rotational energy,
a generator for converting the rotational energy of the turbine into electric energy,
a power controller for performing power control of the electric energy obtained by the generator, and
a power converter for controlling input power and output power in accordance with an instruction from the power controller,
the control method comprising the steps of:
calculating a two-phase current and a two-phase voltage by converting an output voltage and an output current of the generator into a stationary d-q coordinate system and calculating an output of the generator from the two-phase current and the two-phase voltage;
detecting an induced voltage from the two-phase current and the two-phase voltage;
detecting a phase of the induced voltage from the detected induced voltage;
calculating a rotational speed of the induced voltage by differentiating the detected phase of the induced voltage and estimating a shaft speed of the generator; and
calculating an output of the turbine by using the estimated shaft speed value and the calculated output of the generator.

6. The control method of a power generation system according to claim 5, further comprising the steps of:
calculating a torque of the turbine from the calculated output of the turbine and the estimated shaft speed value; and
calculating a shaft speed instruction value from the calculated torque of the turbine.

7. The control method of a power generation system according to claim 6, wherein the step of calculating the shaft speed instruction value from the calculated torque of the turbine comprises the steps of:
sampling the calculated torque of the turbine at constant time intervals and calculating $(T_{tur}(n)-T_{tur}(n-1))/t_s$ to calculate a torque variation $\Delta T_{tur}(n)/t_s$, where a current torque of the turbine is $T_{tur}(n)$, a previous torque of the turbine is $T_{tur}(n-1)$, and the torque variation is $t_s$;
calculating a solution of a relational expression of an output coefficient determined depending upon characteristics of the turbine and the torque variation $\Delta T_{tur}(n)/t_s$; and
calculating the shaft speed instruction value on the basis of the calculated solution.

8. The control method of a power generation system according to claim 6, further comprising the steps of:
sampling the calculated output of the turbine at constant time intervals and calculating a difference $\Delta P(n)$ between a current output of the turbine $P_{tur}(n)$ and a previous output of the turbine $P_{tur}(n-1)$;

calculating a micro speed instruction value by multiplying the calculated difference $\Delta P(n)$ by a proportional gain;

limiting the absolute value of the calculated micro speed instruction value to a predetermined limitation value; and adding the calculated micro speed instruction value to the calculated shaft speed instruction value and outputting the added value as a new shaft speed instruction value.

* * * * *